(12) United States Patent  
Carden

(10) Patent No.: US 6,178,739 B1
(45) Date of Patent: Jan. 30, 2001

(54) MONOPROPELLANT ASSISTED SOLID ROCKET ENGINE

(75) Inventor: Michael J. Carden, Des Moines, IA (US)

(73) Assignee: Iowa State University Research Foundation, Inc., Ames, IA (US)

( * ) Notice: Under 35 U.S.C. 154(b), the term of this patent shall be extended for 0 days.

(21) Appl. No.: 09/025,898

(22) Filed: Feb. 19, 1998

Related U.S. Application Data

(60) Provisional application No. 60/054,387, filed on Jul. 31, 1997.

(51) Int. Cl.[7] ........................................................ F02K 9/72
(52) U.S. Cl. .................................. 60/218; 60/220; 60/251
(58) Field of Search ................................. 60/37.462, 209, 60/210, 218, 220, 251

(56) References Cited

U.S. PATENT DOCUMENTS

| | | | |
|---|---|---|---|
| 3,065,597 | * 11/1962 | Adamson et al. | 60/218 |
| 3,302,403 | * 2/1967 | Krzycki et al. | 60/220 |
| 4,424,085 | * 1/1984 | Fukuma et al. | 149/19.1 |
| 5,552,093 | * 9/1996 | Lee | 264/3.1 |

\* cited by examiner

*Primary Examiner*—Louis J. Casaregola
(74) *Attorney, Agent, or Firm*—Zarley, McKee, Thomte, Voorhees & Sease

(57) ABSTRACT

A monopropellant assisted solid rocket engine of the present invention is comprised of a combination of a solid rocket engine with nitromethane monopropellant injected into the rocket motor. By controlling the rate at which the monopropellant is injected the thrust of the rocket engine can be controlled.

17 Claims, 2 Drawing Sheets

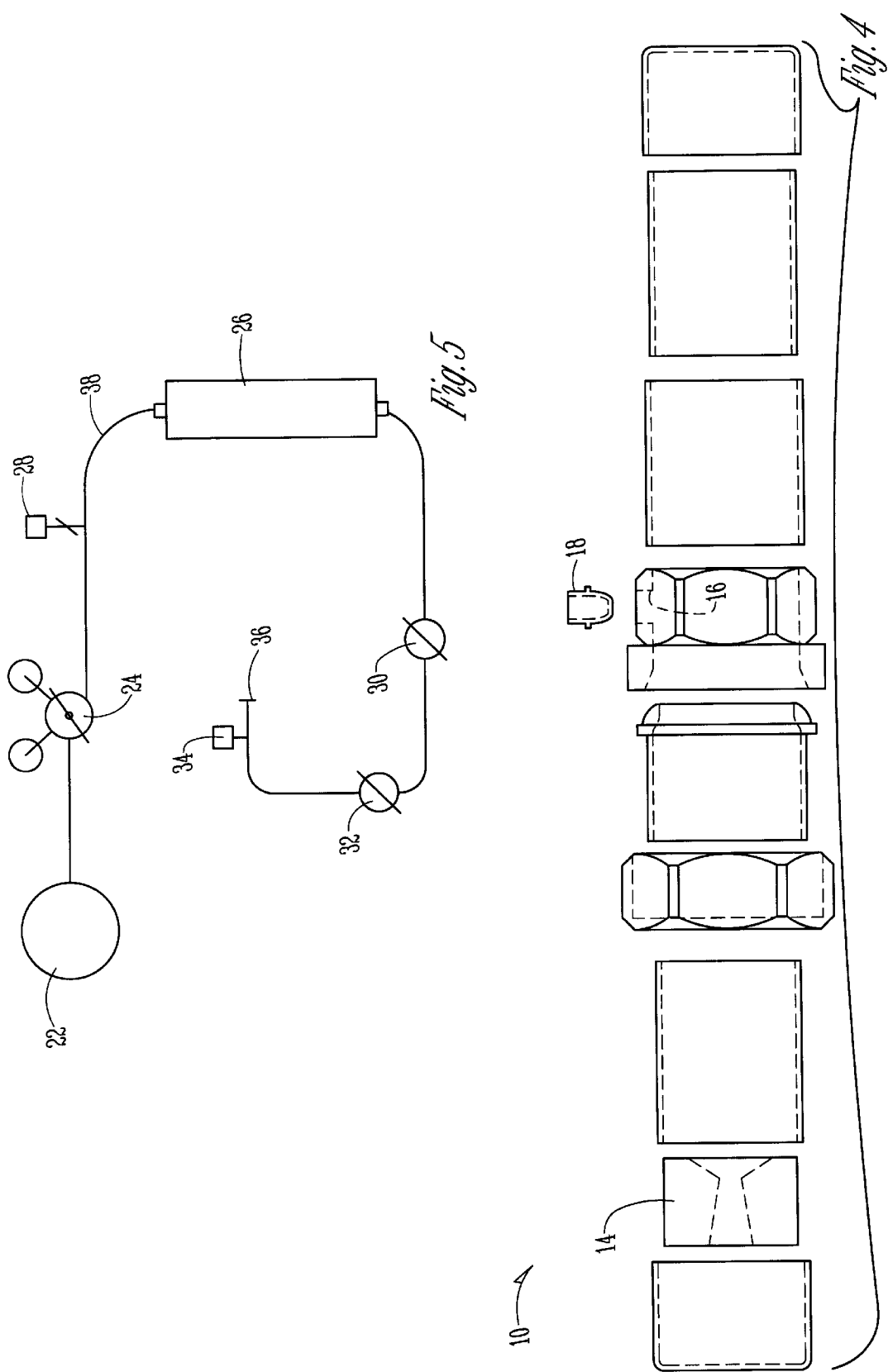

MONOPROPELLANT ASSISTED SOLID ROCKET ENGINE

This application is based on Applicante's Provisional Patent Application Ser. No. 60/054,387 filed Jul. 31, 1997.

BACKGROUND OF THE INVENTION

1. Field of the Invention

The present invention relates to rocket engines. More particularly, though not exclusively, the present invention relates to a method and apparatus for providing a monopropellant assisted solid rocket engine.

2. Problems in the Art

Rocket engines have been used for years to propel various objects or vehicles. Generally, a rocket engine operates as follows. When a hot gas under pressure is produced by the burning of a rocket fuel (the propellant) in a combustion chamber, the gas will exercise an equal pressure in all directions upon the walls within the chamber. If an opening (a nozzle) is made in one wall of the chamber, the gas will stream out of the nozzle at a supersonic velocity. At the same time, a reaction force will be exerted on the opposite side of the chamber. It is this reaction force that thrusts a rocket forward.

Rockets can be classified into solid-propellant, liquid-propellant, and hybrid rockets. In a liquid-propellant rocket, the liquid combustibles are contained in tanks and fed into the combustion chamber through an injector head by a propellant supply system. Most liquid-propellant rockets use two combustibles such as liquid oxygen and kerosene, where the oxygen is provided to combust the kerosene. The propellants are injected at a high pressure into the combustion chamber, at which time the propellants are atomized, mixed, and burned. The hot gaseous combustion products are expelled through the exhaust nozzle propelling the rocket. In a solid-propellant rocket, the propellant consists of combustibles and an agent supplying oxygen for its combustion. The propellant is introduced into the combustion chamber, where it burns producing a hot-pressure gas which is discharged through a nozzle and produces the thrust that propels the rocket. With a hybrid rocket, a liquid oxygen supplying agent can be used in conjunction with a solid combustible, whereby a better control of the thrust developed by the rocket motor is obtained.

The new rocket engine of the present invention is in a class by itself, whereby the liquid is not an oxidizer but a monopropellant.

FEATURES OF THE INVENTION

A general feature of the present invention is the provision of a method and apparatus for providing a rocket engine which overcomes problems found in the prior art.

A further feature of the present invention is the provision of a method and apparatus for providing a monopropellant assisted solid rocket engine.

Further features, objects, and advantages of the present invention include:

A method and apparatus for providing a monopropellant assisted solid rocket engine which provides a simple, safe and inexpensive rocket engine.

A method and apparatus for providing a monopropellant assisted solid rocket engine which provides moderate thrust efficiencies with throttle capability.

A method and apparatus for providing a monopropellant assisted solid rocket engine which reaches supersonic flows within a DeLaval nozzle at low chamber pressures (e.g., 20–40psi).

A method and apparatus for providing a monopropellant assisted solid rocket engine which uses nitromethane as the monopropellant.

A method and apparatus for providing a monopropellant assisted solid rocket engine which can be used for launching vehicles into orbit.

A method and apparatus for providing a monopropellant assisted solid rocket engine which can be used for air-to-air missiles.

A method and apparatus for providing a monopropellant assisted solid rocket engine which provides a wide throttling range (e.g., 16%–100%).

A method and apparatus for providing a monopropellant assisted solid rocket engine which can be utilized in the model rocket industry.

These as well as other features, objects and advantages of the present invention will become apparent from the following specification and claims.

SUMMARY OF THE INVENTION

The method and apparatus for providing a monopropellant assisted solid rocket engine of the present invention includes the use of a monopropellant injected into a solid fuel rocket engine. By injecting the monopropellant into the rocket engine, the rocket engine performs in a manner superior to the prior art. In addition, the present invention provides a method for throttling a solid rocket engine. In the preferred embodiment, the monopropellant is comprised of nitromethane.

BRIEF DESCRIPTION OF THE DRAWINGS

FIG. 4 is an exploded view of the rocket engine shown in FIG. 1.

FIG. 5 is a schematic diagram of the fuel delivery system used by the present invention.

DETAILED DESCRIPTION OF THE PREFERRED EMBODIMENT

Figure 1:
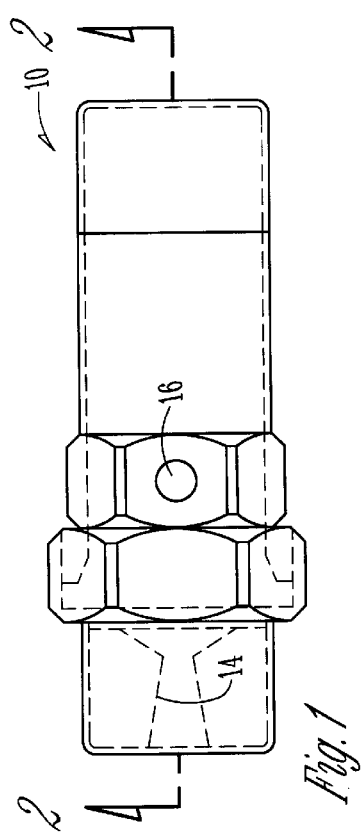
FIG. 1 is a view of a rocket engine of the present invention.

The present invention will be described as it applies to its preferred embodiment. It is not intended that the present invention be limited to the described embodiment. It is intended that the invention cover all alternatives, modifications, and equivalencies which may be included within the spirit and scope of the invention.

FIGS. 1–4 show views of a rocket engine of the present invention. Note that the views in FIGS. 1–4 show a scaled down prototype version of a rocket engine used for testing and verification of the design of the present invention. However, the rocket engine of the present invention is intended to be used in both a small scale and on a large scale.

FIGS. 1–4 show a rocket engine 10, including in combination, a combustion chamber 12 and a nozzle 14. An opening 16 is provided and is adapted to receive an injector 18 (FIG. 4). Note that the figures illustrate alternate locations for the opening 16 and injector 18. Various locations and structures of the combustion chamber 12 and injector 18 fall within the scope of the present invention. The structure of the combustion chamber 12, nozzle 14, and opening 16 are considered to be conventional and, by themselves, are not the subject of the present invention. Various background information and details with respect to rocket engines and fuels can be found in the following references which are incorporated by reference herein: Angus Chemical Company, *Nitromethane Technical Data Sheet,* Pamphlet, 1994; Krzycki, Leroy J. and MIT, LCS., *How to Design, Build, and Test Small Liquid-Fuel Rocket Engines,* California: ROCKETLAB, 1967; and Purrington, Gary W., *Plastic Resin Bonded High Energy Rocket Fuel Systems,* Firefox Enterprises, Inc., 1989.

Rocket engines are designed for specific missions. It is therefore desirable to delineate the minimum operating parameters for any alternative fuel rocket systems. Specific rocket engines then may be designed with these parameters in mind.

When the present invention was being developed, various possible propellants were considered. In addition, the theoretical specific impulse was also considered for each propellant possibility. A specific impulse of over 200 seconds at 300 psi chamber pressure was a standard that was used to determine "moderate thrust efficiencies" (at sea level pressure). Critical factors in selecting a preferred propellant included cost, safety, and performance.

Past work with nitromethane monopropellant engines had problems with the monopropellant burning up through the injector into the full tank. This invention overcomes this by requiring an injector that will not support monopropellant burning alone. A secondary heat source, the solid fuel, must also be present.

An option considered included the use of nitromethane as a propellant. A monopropellant engine using nitromethane may also be impractical with limited available resources. A minimum chamber pressure of 500 psi would be needed to obtain stable combustion, which in turn would require a tank pressure of 600 psi. Unfortunately, the high pressures involved would necessitate equipment that is expensive. One other problem with monopropellants is that the monopropellant has a tendency to burn up into the injector and fuel tank.

A second option considered included the use of a propellant consisting of a monopropellant assisted solid (MAS) rocket engine. There are two methods of achieving stable combustion with nitromethane in a rocket engine. A first method is by using a fuel known as "Neofuel" (an ethylene oxide mixture with nitromethane). The second method is to inject a solid motor with nitromethane. Under this second option, a nitromethane monopropellant is injected in a sustainer motor of ammonium perchlorate and P-BAN polymer binder solid fuel. Preferably, a hybrid engine of ammonium perchlorate/P-BAN with nitromethane and methanol is used, although other solid fuels could also be used. Ammonium perchlorate propellant is safe to manufacture and the methanol moderates the nitromethane to a safe sensitivity level. Technically, this combination engine could be viewed as a reverse hybrid engine with monopropellant augmentation. Note that since a monopropellant is used, only one pipe is connected to the combustion chamber 12 since the monopropellant does not need external oxygen (as opposed to a fuel plus oxygen).

First, the solid fuel section of the rocket engine 10 will be described. After careful research into properties of common solid oxidizers, ammonium perchlorate was chosen as the preferred oxidizer. Ammonium perchlorate has been in operational use for years, and its characteristics are well known. In the preferred embodiment, ammonium perchlorate (AP)/polybutadiene polymer (P-BAN) solid fuel is used. The leading particulars for the sustainer section of the engine are that it must burn with an excess of oxygen (in order to burn the methanol with nitromethane), be nontoxic, and be formed into a propellant grain without elaborate processing. The fuel grain must also burn consistently without chuffing at low chamber pressures. The AP/P-BAN fuel system has all of these characteristics.

Figure 2:
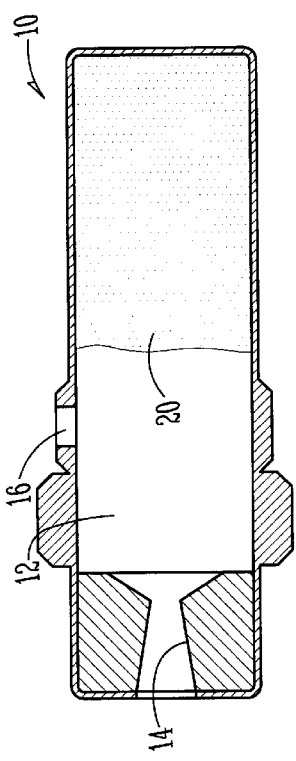
FIG. 2 is a sectional view taken along lines 2—2 of FIG. 1.
Figure 3:
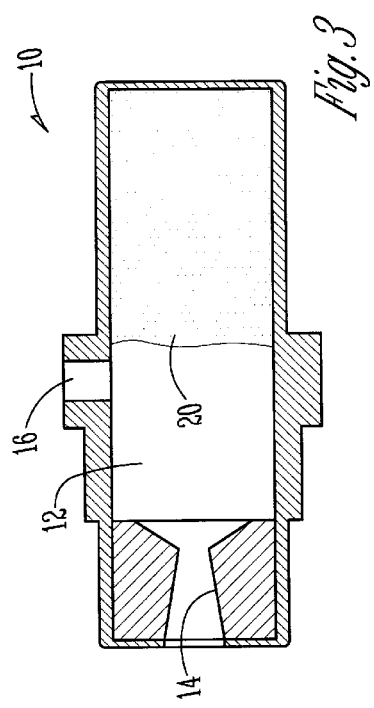
FIG. 3 is a sectional view similar to FIG. 2, but of an alternate embodiment.

Note that damage to or destruction of engines could be caused by the fuel burn rate exponent of ammonium perchlorate when used with a lean mixture of polymer binder. During testing of the present invention, an initial mixture of fuel included 89% ammonium perchlorate, 10% P-BAN, and 1% iron oxide. This mixture causes the ammonium perchlorate combustion to run away and produce far more gasses than the engine could withstand. Chamber pressures over 600 psi were reached. To overcome this problem, a mix of 17% polymer to 80% ammonium perchlorate with the remainder iron oxide was used. This produces steady grain burns that are consistent and reliable. An end-burning grain geometry may be used to produce a steady stream of hot oxidizing gasses for the nitromethane. FIGS. 2 and 3 illustrate the solid fuel 20 disposed within the combustion chamber 12 of the rocket 10. Of course, more or less fuel 20 could be placed within the combustion chamber 12.

FIG. 5 is a schematic diagram of the nitromethane fuel system. The fuel system comprises a pressurized nitrogen tank 22, a regulator 24, a PVC fuel tank 26 for holding the propellant, and valving and connection hardware connecting the fuel system to the rocket engine 10. The valving and connection hardware includes a cap and valve 28, a ball valve 30, a needle valve 32, a fueling port 34 (no valve), and a cap 36 which will be connected to the injector 18 (FIG. 4) by a flexible tube. The schematic of FIG. 5 also shows ⅜" soft copper tubing 38 which connects the various components together. In the embodiment shown in the figures, the PVC fuel tank 26 contains 400 cm$^3$ of propellant (although the size of the tank would depend the size of the rocket engine), preferably liquid nitromethane.

By experimentation, the fuel flow rates were determined at specific tank pressures. Nitromethane was pressurized nominally at 100 psi, however, it was also pressurized to 150 psi on one occasion. Top-fuel dragsters put the practical fuel pump pressure limit at 300 psi with a safety limit of 500 psi for nitromethane. The fuel used in the preferred embodiment is a mix of 90% nitromethane and 10% methanol by weight. Using this mixture, no explosion or sudden rises in pressure were observed while using the nitromethane. An operational rocket could use a 95% /5% mixture.

When the materials for building the rocket 10 were considered, several criterion needed to be met. The motor materials need to be nonflammable, available, strong, and heat resistant. Although several materials meet this criterion, for the purposes of verifying the design of the present invention, copper and brass were chosen. This is due to copper and brass being inexpensive with fair strength and the ability to conduct heat well. For testing purposes, the actual rocket components included common plumbing supplies which are easily obtained. There was little fabrication and machining needed with this prototype design, and assembly was simple. A commercial version of the rocket 10 would preferably comprise custom steel, titanium, composite, and ceramic components. The prototype included an inner heat shielding comprising fiberglass cloth with standard polyester resin. Carbon fiber will provide better protection, but is expensive, as is the resin needed for this material. The injector 18 in the prototype of the present invention was comprised of a fuel oil furnace nozzle rated at two gallons per hour at 100 psi. In the preferred embodiment, the injector is a conical spray injector. The hole 16 was drilled into the side of the engine 10 and the injector 18 mounted in place with silver solder. With the present invention, the stream of monopropellant is so thick that it cannot support the type of combustion that causes the monopropellant to burn up into the injector and fuel tank as described above. In the preferred embodiment of the prototype, the nozzle 14 was machined from a graphite rod. Graphite is a common material in engine nozzles/throat designs. Graphite has a high evaporation temperature, good machining properties, and a low cost.

The rocket engine 10 of the present invention operates as follows. As described above, a volume of solid rocket fuel 20 is placed within the combustion chamber 12 as shown in FIGS. 2 and 3. The injector 18 is located within the hole 16 and is connected to the fuel delivery system shown in FIG. 5. The tank 26 is filled with the monopropellant, preferably liquid nitromethane. To fire the engine 10, the solid fuel 20 is ignited. By injecting the monopropellant (nitromethane) into the combustion chamber 12 via the injector 18, the monopropellant is injected into a burning engine (solid fuel) so that both the liquid and solid fuel are burned.

One characteristic of solid fuels is that as the pressure in the combustion chamber increases, the solid fuel burns faster. This is known as the fuel burn rate exponent. As a result, with the present invention, as the monopropellant is injected into the combustion chamber, the pressure is increased which increases the rate at which the solid fuel burns. Therefore, by controlling the rate that the monopropellant is injected into the combustion chamber, a user may control (1) the amount of fuel injected into the combustion chamber, and (2) the rate at which the solid fuel burns. With prior art rocket engines, the rate at which solid fuel burns is not controllable.

As mentioned above, the present invention may be used with both large scale rocket engines and small scale rocket engines. One possible use of a small scale use involves the model rocket industry. Presently, there is no throttleable launch realism in the model rocket industry. The present invention would provide this benefit.

The monopropellant feed system of nitromethane improves reliability. Only one turbo pump is needed, which can be designed to operate off chamber pressure. If turbojet assist takeoff is used, the mass ratio needed for orbit would be approximately 14:1.

The rocket engine 10 of the present invention has many advantages over prior art rocket engines. The rocket engine 10 holds advantages in some flight profiles, including air-to-air missiles. One advantage gained with air-to-air missiles is that the engine can be throttled. If a missile loses its target, it can throttle down, turn around, regain the target, and throttle up again. As a result of the throttling capability, rocket distance can also be increased.

The rocket of the present invention also has the following potential advantages over the prior art: simple construction and use, reliable with backup operation, inexpensive and powerful fuels (a combined cost of propellants between $1–$2 per pound), a possible wide throttling range (16%–100%), a high fuel density, a wide temperature operating range, fuels that are storable in a rocket for years, and a simplified turbo pump design.

Engine performance data was gathered from a pressure gauge tap (not shown) in the combustion chamber walls of the prototype of the present invention. The pressure gauge tap went to a 0–100 psi pressure gauge (not shown) mounted away from the engine 10. A video camera captured the gauge and engine with 1/200 shutter speed and 60 frames per second capture rate. Supersonic flows were achieved when the chamber pressure reached 13 psi at the estimated chamber temperature.

A test run showed a chamber pressure of 23 psi. The amount of fuel consumed was known, and an estimated chamber temperature of 4225 degrees Rankine was observed. The calculated engine performance was 89 seconds impulse at this pressure. By extrapolating the data and estimating a chamber pressure of 300 psi, the specific impulse would be 206 seconds. This means that for every pound of propellant burned per second, 206 pounds of thrust would be produced. Engine vacuum performance would be above 300 seconds using a 2:1 nitromethane/solid mixture. The liquid/solid ratio was 0.6:1 in this test, and the measurement margin of error was +/−10%.

Table I is a table illustrating the specifications and the measured engine performance data of the preferred embodiment of a prototype such as that shown in FIGS. 1–5. Table II is a table similar to a portion of Table I illustrating the chamber pressure, chamber temperature, and Isp of potential engine performance estimates at sea level with optimum expansion and two parts nitromethane and one part solid fuel. Table III is a table similar to Table II illustrating the chamber pressure, chamber temperature, and Isp of potential engine performance estimates at 100,000 feet altitude with optimum expansion. While the engine 10 was not be operated at 1000 psi, that is used as a benchmark for comparison with other fuel combinations. Approximately 600 psi would be a good maximum engine pressure.

TABLE I

| | |
|---|---|
| Engine Type | Monopropellant assisted solid rocket engine |
| Engine Cycle | Pressure-fed |
| Propellant Type | Ammonium Perchlorate and P-BAN polymer |
| Grain Geometry | End burning |
| Grain Size | 1.4" diameter × 1.4" long |
| Burn Time | 34 seconds nominal |
| Fuel Consumption | .00779 ib./sec. |
| Throat Diameter | .25" |
| Thrust | .7 lb. estimated |
| Chamber Temperature | 4225 R estimated |
| Chamber Pressure | 23 psi |
| Isp | 89 seconds estimated |
| Cooling | Ablative |
| Nozzle Type | Graphite |

TABLE II

| | |
|---|---|
| Chamber Pressure | 1000 psi |
| Chamber Temperature | 5000 R |
| Isp | 255 seconds theoretical |

TABLE III

| | |
|---|---|
| Chamber Pressure | 1000 psi |
| Chamber Temperature | 5000 R |
| Isp | 310 seconds theoretical |

Following are some important safety notes. Ammonium perchlorate is a safe oxidizer to use with rockets when certain safety precautions are taken. It is not toxic to personnel using it, with the exception of being flammable when in contact with a fuel. A minor amount of ammonia was released when the P-BAN polymer was mixed. HCl gas is produced when it burns. An alternate oxidizer to use would be Phase-stabilized Ammonium Nitrate (PAN) or a mixture with lithium nitrate.

Nitromethane has a moderate toxicity when inhaled and is a fire hazard. These dangers can be overcome by reasonable precautions. Nitromethane is an explosive at high temperatures and extreme pressures. The envelope of safety would not be exceeded with an operational engine operating at 600 psi.

In research relating to nitromethane, it was found that an operational nitromethane rocket could be safely used if the tank pressures did not exceed 800 psi. This is due to the detonability of nitromethane. Nitromethane cannot be detonated in vessels that have less than a 800 psi burst strength unless an excessive amount of explosives are used to start the detonation; an operational missile with a fiber reinforced tank with a burst strength of 800 psi would be appropriate and safe from detonation when nitrogen gas for pressurent would be used. Confined nitromethane is susceptible to detonation in a very strong container and extreme shock due to its high adiabatic compression temperature. It was concluded that the nitromethane/solid fuels are safe as long as the chamber pressures do not exceed 600 psi. This constraint is due to the sensitivity of the nitromethane and methanol mixture.

The preferred embodiment of the present invention has been set forth in the drawings and specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit and scope of the invention as further defined in the following claims.

What is claimed is:

1. A method of operating a rocket engine comprising the steps of:
    providing a solid fuel rocket engine having a combustion chamber and a nozzle;
    placing solid rocket fuel within the combustion chamber;
    igniting the solid rocket fuel; and
    injecting a monopropellant into the combustion chamber with the ignited solid fuel.

2. The method of claim 1 further comprising the step of conical spraying a monopropellant as it is injected into the combustion chamber.

3. The method of claim 1 further comprising the step of increasing pressure within the combustion chamber by injecting the monopropellant into the combustion chamber, to increase the rate at which the solid rocket fuel burns.

4. The method of claim 1 further comprising the step of controlling the rate at which the monopropellant is injected into the combustion chamber.

5. A method of operating a rocket engine comprising the steps of:
    providing a solid fuel rocket engine having a combustion chamber and a nozzle;
    placing solid rocket fuel within the combustion chamber;
    igniting the solid rocket fuel; and
    injecting a monopropellant into the combustion chamber wherein the monopropellant injected into the combustion chamber is comprised of nitromethane.

6. The method of claim 5 wherein the monopropellant is comprised of approximately 90% nitromethane and approximately 10% methanol by weight.

7. The method of claim 1 wherein the solid rocket fuel is disposed within the combustion chamber in an end burning geometry.

8. A method of enhancing the operating a solid fuel rocket engine comprising the steps of:
    providing a solid fuel rocket engine having a combustion chamber, a nozzle, and a quantity of solid rocket fuel disposed within the combustion chamber;
    providing a source of nitromethane;
    igniting the solid rocket fuel; and
    injecting the nitromethane into the combustion chamber to enhance the operation of the solid fuel rocket engine.

9. The method of claim 8 further comprising the step of controlling the rate at which the nitromethane is injected into the combustion chamber.

10. The method of claim 8 wherein the solid rocket fuel contains of ammonium perchlorate.

11. The method of claim 8 wherein the solid rocket fuel is comprised of ammonium perchlorate/polybutadiene polymer.

12. A rocket engine comprising:
    a combustion chamber;
    a nozzle in communication with the combustion chamber;
    a quantity of solid rocket fuel disposed within the combustion chamber;
    a conical spray injector in communication with the combustion chamber for injecting a liquid fuel into the combustion chamber; and
    a source of monopropellant connected to the conical spray injector, wherein the injector is adapted to inject the monopropellant into the combustion chamber while the solid rocket fuel is burning to augment the performance of the rocket engine.

13. The rocket engine of claim 12, wherein the solid rocket fuel contains ammonium perchlorate.

14. The rocket engine of claim 12, wherein the solid rocket fuel contains ammonium perchlorate/polybutadiene polymer.

15. The rocket engine of claim 12, wherein the solid rocket fuel is comprised of a mixture of a polymer, ammonium perchlorate, and iron oxide.

16. A rocket engine comprising;
    a combustion chamber;
    a nozzle in communication with the combustion chamber;
    a quantity of solid rocket fuel disposed within the combustion chamber;
    a conical spray injection in communication with the combustion chamber for injecting a liquid fuel into the combustion chamber;
    and a source of monopropellant connected to the conical spray infector, wherein the infector is adapted to infect the monopropellant into the combustion chamber while the solid rocket fuel is burning to augment the performance of the rocket engine wherein the monopropellant is comprised of nitromethane.

17. The rocket engine of claim 16 further comprising a regulator for controlling the rate at which the monopropellant is injected into the combustion chamber.

* * * * *